United States Patent

Megiddo et al.

[11] Patent Number: 6,148,295
[45] Date of Patent: Nov. 14, 2000

[54] METHOD FOR COMPUTING NEAR NEIGHBORS OF A QUERY POINT IN A DATABASE

[75] Inventors: Nimrod Megiddo, Palo Alto, Calif.; Uri Shaft, Madison, Wis.

[73] Assignee: International Business Machines Corporation, Armonk, N.Y.

[21] Appl. No.: 09/000,560

[22] Filed: Dec. 30, 1997

[51] Int. Cl.[7] .................................................. G06F 17/30
[52] U.S. Cl. ........................................ 707/3; 707/4; 707/5
[58] Field of Search ............................. 707/3, 4, 5, 100, 707/102

[56] References Cited

U.S. PATENT DOCUMENTS

| 4,907,276 | 3/1990 | Aldersberg | 704/222 |
| 5,440,742 | 8/1995 | Schwanke | 395/703 |
| 5,579,471 | 11/1996 | Barber et al. | 345/326 |
| 5,598,559 | 1/1997 | Chaudhuri | 707/2 |
| 5,630,121 | 5/1997 | Braden-Harder et al. | 707/102 |
| 5,799,301 | 8/1998 | Castelli et al. | 707/6 |
| 5,857,169 | 1/1999 | Seite | 704/256 |
| 5,884,320 | 3/1999 | Agrawal et al. | 707/104 |

OTHER PUBLICATIONS

N. Beckman et al., The R*–tree: An Efficient and Robust Access Method for Points and Rectangles, ACM 089791–365–5/90/0005/0322, pp. 322–330, 1990.

T. Brinkhoff et al., Parallel Processing of Spatial Joins Using R–trees, Institute for Computer Science, niversity of Munich, Leopoldstr. 11 B, D–80802, München, Germany, date unknown.

A. Butz, Alternative Algorithm For Hilbert's Space–Filling Curve, IEEE Transactions on Computers, Apr. 1971, pp. 424–426.

A. Butz, Convergence with Hilbert's Space Filling Curve, Journal of Computer and System Sciences, 3, pp. 128–146, 1969.

A. Butz, Space Filling Curves and Mathematical Programming, Information and Control, 12, pp. 314–330, 1968.

A. Guttman, R–trees: A Dynamic Index Structure For Spatial Searching, ACM 0–89791–128–8/84/006/0047, pp. 42–57, 1984.

A. Irahim et al., Indexing and retrieving point and region objects, SPIE vol. 2670, 1996, pp. 321–336.

H.V. Jagadish, A Retrieval Technique for Similar Shapes, ACM 0–89791–425–2/91/005/0208, pp. 208–246, 1991.

K.–I. Lin et al., The TV–Tree: An Index Structure for High–Dimensional Data, VLDB Journal, 3, pp. 517–542, 1994.

(List continued on next page.)

*Primary Examiner*—Paul V. Kulik
*Attorney, Agent, or Firm*—Khanh Q. Tran; Banner & Witcoff, Ltd

[57] ABSTRACT

A method for determining k nearest-neighbors to a query point in a database in which an ordering is defined for a data set P of a database, the ordering being based on 1 one-dimensional codes $C_1, \ldots, C_1$. A single relation R is created in which R has the attributes of index-id, point-id and value. An entry $(j,i,C_{ej}(p_i))$ is included in relation R for each data point $p_i$ EP, where index-id equals j, point-id equals i, and value equals $C_{ej}(p_i)$. A B-tree index is created based on a combination of the index-id attribute and the value attribute. A query point is received and a relation Q is created for the query point having the attributes of index-id and value. One tuple is generated in the relation Q for each j, j=1, . . . , 1, where index-id equals j and value equals $C_{ej}(q)$. A distance d is selected. The index-id attribute for the relation R of each data point $p_i$ is compared to the index-id attribute for the relation Q of the query point. A candidate data point $p_i$ is selected when the comparison of the relation R of a data point $p_i$ to the index-id attribute for the relation Q of the query point is less than the distance d. Lower bounds are calculated for each cube of the plurality of cubes that represent a minimum distance between any point in a cube and the query point. Lastly, k candidate data points $p_i$ are selected as k nearest-neighbors to the query point.

2 Claims, 1 Drawing Sheet

OTHER PUBLICATIONS

D. Lomet et al., The hB–Tree: A Multiattribute Indexing Method with Good Guaranteed Performance, ACM Transactions on Database Systems, vol. 15, No. 4, Dec. 1990, pp. 625–658.

P. Prusinkiewicz et al., Synthesis of Space–Filling Curves On The Square Grid, Fractals in the Fundamental and Applied Sciences, H.–O. Peitgen et al. editors, Elsevier Science Publishers B.V. pp. 341–367, 1991.

H. Ralambondrainy, A conceptual version of the K–means algorithm, Pattern Recognition Letters 16, pp. 1147–1157, 1995.

J.T. Robinson, The K–D–B Tree: A Search Structure for Large Multidimensional Dynamic Indexes, ACM–SIGMOD Conference Proceedings, Apr. 1981, pp. 10–18.

H. Samet, The Design and Analysis of Spatial Data Structures, Addison–Wesley Publishing Co., Inc., pp. 43–80, 1990.

H. Sagen, Space–Filling Curves, Universitext, Springer–Verlag, 1994, pp. 1–30.

T. Sellis et al., The $R^+$–tree: A Dynamic Index for Mult–Dimensional Objects, UMIACS–TR–87–3, CS–TR–1795, Feb. 1987.

A.P. Sistla et al., Similarity based Retrieval of Pictures Using Indices on Spatial Relationships, Proceedings of the 21st VLDB conference Zurich, Switzerland, pp. 619–629, 1995.

R.J. Stevens et al., Manipulation and presentation of Multidimensional Image Data Using the Peano Scan, IEEE Transactions on pattern Analysis and Maching Intelligence, vol. PAMI–5, No. 5, Sep. 1983, pp., 520–526.

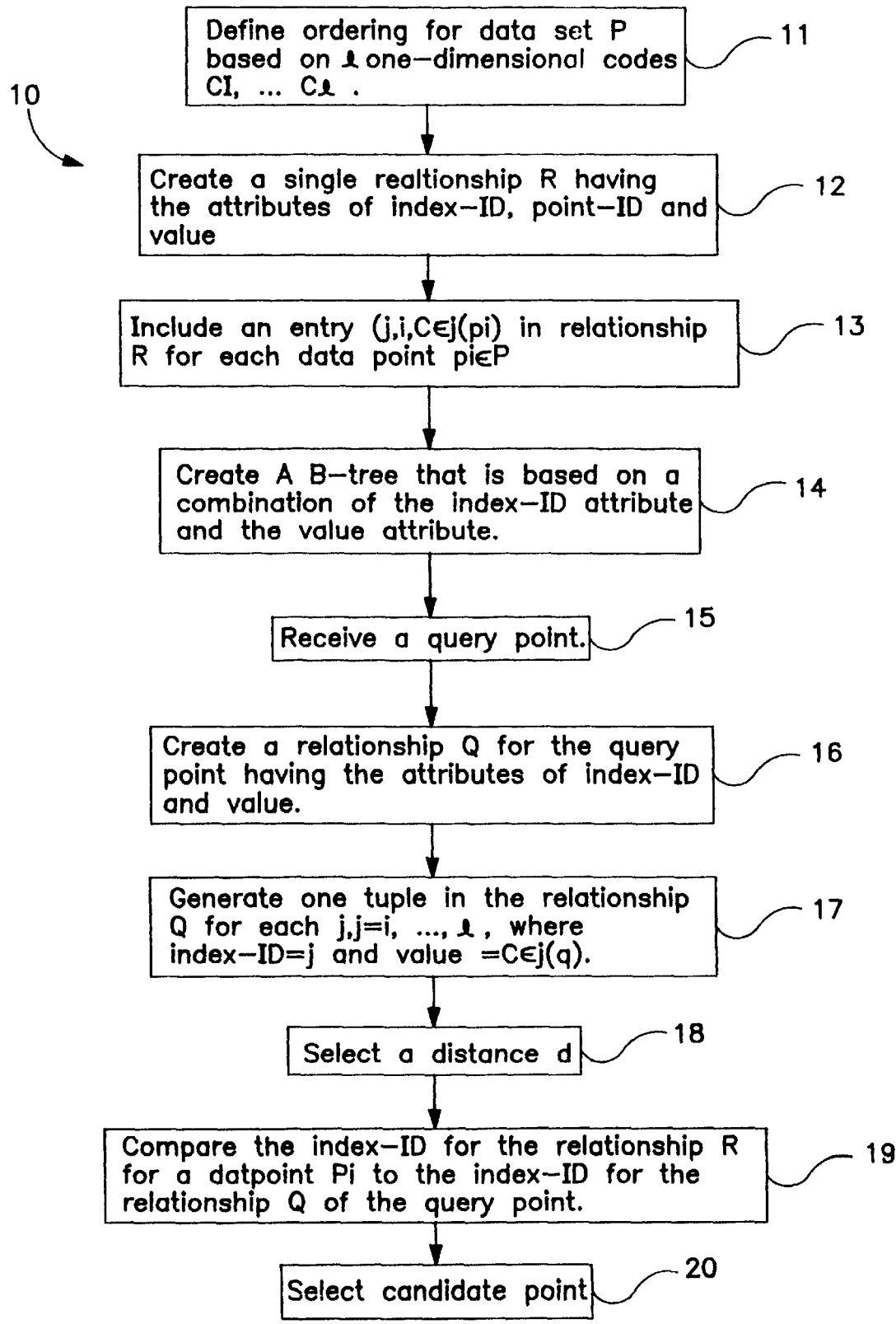

METHOD FOR COMPUTING NEAR NEIGHBORS OF A QUERY POINT IN A DATABASE

BACKGROUND OF THE INVENTION

1. Field of the Invention

The present invention relates to the field of computing. More particularly, the present invention relates to a method for processing queries in a database management system.

2. Description of the Related Art

Imagine a database DB consisting of points from $S = D_1 \times \ldots \times D_n$, where $D_i \subseteq R$. For present purposes, the following discussion will be restricted to the case of $S = D^n$, where D is the set of rational numbers in [0,1) having denominators that are powers of 2, although the results can be extended to a general case. Each $D_i$ usually consists of either integers or floating-point numbers. Each point in the database can be represented by an n-tuple $(x_1, \ldots x_n)$ of real numbers, where n can be on the order of, for example, 100. A k nearest-neighbors query consists of a query point $q = (q_i, \ldots, q_n) \in D^n$ and an integer k representing the number of database points that are to be returned as being near to the query point. The query point may not necessarily be in the database. The sense of the nearest can be with respect to a Euclidean metric or another $l_p$-metric. An (exact) output set O consists of k points from the database such that $$\forall p' \in O \text{ and } \forall p'' \in DB \setminus O \|p'-q\| \leq \|p''-q\|.$$

If the database is large and a quick response is required, a good approximate output is usually sought. The approximate output can be a set of points that overlaps the exact output set O to a large extent, or a set of points having distances to the query point that are not much larger than the distances of the exact output set to the query point. Image features, for example, are sometimes mapped into $D^n$ within an image database management system (DBMS). Image similarity is determined based on a distance between features in $D^n$. A similarity metric for the image DBMS can be an approximation of a desired degree of similarity, so adding a small approximation error associated with an approximate output would not significantly affect the results.

A problem associated with a k nearest-neighbors query is how a DBMS application processes such a query so that a suitable approximate output is returned within a desired response time. The goodness of an approximate output depends, of course, on each application, and the response time depends on the processing needs of the DBMS, such as disk I/O and CPU time. All currently known methods for generating an output to a k nearest-neighbors query require calculation of distances between the query point and many database points. The computational effort is dominated by the number of distance calculations. Data points are fetched from random locations in the database. A database having a high dimensionality requires that the database indexes that are used cannot significantly restrict the number of points that must be fetched. In many cases, a complete linear scan of the database out-performs the currently known methods for generating an appropriate output.

Various approaches have been tried for determining near neighbors in a database, such as by using bounding boxes or spheres for indexing multidimensional data, by using projections for inducing ordering on database points, and by clustering data points. Most approaches are, nevertheless, limited by the dimensionality of the database. Results based on databases having two- and three-dimensions can be quite misleading when extrapolated to databases having higher dimensions.

For a bounding box or a bounding sphere approach, many hierarchical structures, such as the R-tree family, the hB-tree family and the TV-tree, have been proposed for indexing multidimensional data in database management systems that collect data points into disk pages and compute bounds on the points in the disk page. A bound is usually a minimal bounding box that is parallel to the axes of the system, however, bounding spheres (sphere trees) and convex polyhedra (cell-trees) have also been tried. Nevertheless, the only structures that are used in practice are those of the R-tree family. The collection of disk pages containing the points is stored at the bottom level of the hierarchical structure. The next level up is created by taking a collection of bounds, e.g., the bounding boxes, and treating the collection as data points. The data points are then collected into groups, each fitting on a disk page, and a new bound is computed for each group. The new bound is of the same type as the bounds of a lower level. For example, if boxes are used, then the upper levels use boxes as well. Levels are created until the top level fits on one disk page.

A range query to a structure amounts to specifying a region. Points in the region are determined by going down the structure. If the region overlaps the bounds of a page, then the subtree under that page may contain points that are in the region. A nearest-neighbors query is processed as a query about a small spherical region. If the result does not contain enough points, then the region is enlarged by, for example, doubling the radius of the sphere.

Conventional bounding approaches work well as long as the indexing structure behaves well. That is, the complexity of searched-for points in a region should be proportional to the volume of that region, assuming the region is convex and "nice". This assumption may be justified only in databases of very low dimension, that is, up to 4 dimensions. Careful construction of a hierarchical structure may relax this constraint slightly, permitting searches in 6 or 7 dimensions. For higher dimensions, though, conventional bounding approaches perform far worse than a sequential scan of the entire data set.

A one-dimensional projection approach induces an ordering on a set of database points so that a projection of a query point within the ordering can be quickly located. Projections are continuous, so close points have close projections. On the other hand, distant points may also have close projections. The higher the dimensionality of the database, the more severe the problem of distant points having close projections becomes. That is, for a high dimensional query, when candidates or nearest neighbors are selected from among the points having projections that are close to the projection of the query, the number of candidates becomes large. Good nearest neighbor candidates should have many close projections. Nevertheless, the problem of determining good candidates is closely related to the nearest neighbors problem itself. An interesting theoretical result is reported by D. P. Huttenlocher and J. M. Kleinberg, "Comparing point sets under projection," in Proceedings of the Fifth Annual ACM-SIAM Symposium on Discrete Algorithms (1994), pp. 1–7. The difference between orderings based on one-dimensional projections and orderings based on space filling curves is that, in the latter, proximity in the ordering implies proximity in the space, so if there are sufficiently many orderings, it suffices to consider candidates who are close in at least one of the orderings.

Clustering the database points into clusters reflecting proximity is believed to help in the search for near neighbors. Each cluster is represented by either a database point in the cluster or by the centroid of the cluster. The cluster having a representative point that is closest to the query point is searched first. Other clusters are searched in order of proximity of their representative points to the query point or based on bounds that are derived in various ways. The search is expected to end without checking all the database points. As with other conventional approaches, clustering approaches may break down in a high dimensional database because it may not be possible to identify sufficiently many clusters as being distant.

What is needed is a technique for providing a fast response to an k nearest-neighbors query.

SUMMARY OF THE INVENTION

The present invention provides a technique for providing a fast response to an k nearest-neighbors query. The advantages of the present invention are provided by a method for determining k nearest-neighbors to a query point in a database in which an ordering is defined for a data set P of a database, the ordering being based on l one-dimensional codes $C_1, \ldots, C_l$. Preferably, the step of defining an ordering for a data set P of a database forms a plurality of cubes. A single relation R is created in which R has the attributes of index-id, point-id and value. An entry $(j,i,C_{ej}(p_i))$ is included in relation R for each data point $p_i \in P$, where index-id equals j, point-id equals i, and value equals $C_{ej}(p_i)$. A B-tree index is created based on a combination of the index-id attribute and the value attribute. A query point is received and a relation Q is created for the query point having the attributes of index-id and value. One tuple is generated in the relation Q for each j, $j=1, \ldots, l$, where index-id equals j and value equals $C_{ej}(q)$. A distance d is selected. The index-id attribute for the relation R of each data point $p_i$ is compared to the index-id attribute for the relation Q of the query point. A candidate data point $p_i$ is selected when the comparison of the relation R of a data point $p_i$ to the index-id attribute for the relation Q of the query point is less than the distance d. Lower bounds are calculated for each cube of the plurality of cubes that represent a minimum distance between any point in a cube and the query point. The step of comparing is terminated when no lower bound is less than a distance between the query point and any of the candidate data points. Lastly, k candidate data points $p_i$ are selected as k nearest-neighbors to the query point.

BRIEF DESCRIPTION OF THE DRAWING

The present invention is illustrated by way of example and not limitation in the accompanying sole FIGURE which shows a method for determining k nearest-neighbors to a query point in a database according to the present invention.

DETAILED DESCRIPTION

The present invention provides a fast response to an k nearest-neighbors query by using a spatial indexing technique. Database points are sorted into n different linear orders at the time a database is populated. An identification for each database point is placed into n different prefix-compressed B-trees each corresponding to a respectively different linear order. Each linear order is based on a so-called space-filling curve, so that for any point in the space, a code of the point determines the position of the point in the order. Preferably, the code of the point is a single real number. Each tree also contains information that determines the order relations between the database points. The space-filling curve has a good locality property in the sense that two points that are close in the order are close in the space. Nevertheless, two points that are close in the space may not be as close within the order. For good retrieval performance, it suffices that points that close in the space, but not close within a particular order are close at least in one order. The present invention forms the linear orders in a way that has a high likelihood for the points to be close in at least one order.

The orders are based on curves that deal with the different dimensions of the database in a random order. Additionally, the subdivision of the space defining the curve is shifted randomly, so that there is a high probability that in at least one of the orders, a query point will not be close to a pathological region where points close in the space have distant codes. The B-trees data structure of the present invention is easily updated by adding and/or deleting data points. The underlying orders represented by the various B-trees are data independent, that is, the curves are fixed in advance, so inserting or deleting a point takes O(log N) time per tree, where N is the number of points in the database.

At query time, the position of the query point in each order is determined by a technique that generalizes a Gray code calculation, but stops the calculation of bits as soon as the position of the query point in the order relative to the database points has been determined. A set of candidate near neighbors is then extracted from each B-tree by simply selecting the identification of the points that are within, for example, 30 positions from the query point in the tree. The set of candidate identifications contains many duplicates, so the duplicate points are eliminated. The number of points from each B-tree remaining after eliminating duplicate points may then need to be increased so the number of candidates is at least k.

Each tree stores not only the identification of particular points, but also additional information in the form of bits that determine the order among database points represented by the tree. For each point identification, the bits provide lower and upper bounds on the distance of the data point from a query point, and are useful for deciding whether a particular candidate should be fetched. After several candidate points have been fetched and their respective distances to the query point have been evaluated, the bits stored in the trees may indicate that certain candidate points do not need to be fetched because their distances to the query point are greater than the distances of many other points that have already been calculated, or because their distances to the query point are greater than an upper bound. Distance calculation at this stage can be done with respect to any distance measure that is correlated with a location in a Euclidean space.

The k nearest points among the candidates are then reported. The remaining unreported candidates, as well as the position of the query point within each respective tree is stored for a potential subsequent request for additional points close to the query point. The output can then be easily incremented by fetching additional candidates rather than restarting the search based on a different value of k.

The spatial indexing technique of the present invention used with the database is populated is based on a family of linear orderings of a data space $D^n$. A canonical ordering or encoding based on a one-dimensional code $C:D^n \to D$ is first described. Other orderings based the canonical ordering can also be used.

In order to describe the calculation of C(v) for $v \in D^n$, a convenient representation of v is used in which $v=(v_n, \ldots, v_1)$, where $v_j = \Sigma_{i=1}^{m} v_{ij} 2^{-i}$ ($v_{ij} \in \{0,1\}$, $j=1, \ldots, n$, $i=1, \ldots, m$). Thus, $v = \Sigma_{i=1}^{m} 2^{-i} v^i$, where $v^i = (v_{i1}, v_{i2}, \ldots,$ $v_{in}$) (i=1, ..., m). According to the invention, the encoding of a database point is recursively defined in terms of m based on a code $J: \{0,1\}^n \to \{0, \ldots, 2^n-1\}$ that is essentially the inverse of a Gray code, and in which affine transformations $A_I$ of $R^n$ map boolean vectors to boolean vectors for I=0, ..., $2^n-1$.

The code J defines a linear ordering on the vertices of a unit cube in $R^n$ so that consecutive vertices in the linear ordering are also adjacent in the cube. The code J(x), for every $x=(x_n, \ldots, x_1)$ ($x_i E\{0,1\}$, i=1, ..., n), is represented by $$J(x) = \sum_{i=1}^{n} y_i 2^{i-1},$$

where $y_i E\{0,1\}$. Thus, $0 \le J(x) < 2^n$. The following exemplary pseudocode illustrates an Algorithm J for calculating code J(x):

Algorithm J; input: $(x_n, \ldots, x_1)$; output: $(y_n, \ldots, y_1)$
1. $y_n := x_n$
2. for i=n-1 downto 1 do $y_i := x_i$ or $x_{i+1}$.

It follows that J(0, ..., 0)=0, so (0, ..., 0) is the first member in this ordering. Similarly, J(1,0, ..., 0)=$2^n-1$, so (1,0, ..., 0) is the last member in the ordering. Note that these two vertices are also adjacent. Further, based on the definition of J, $$J(1, x_{n-1}, \ldots, x_1) = 2^n - 1 - J(0, x_{n-1}, \ldots, x_1).$$

A Gray code G(I) that is the inverse of J, can alternatively be used that for mapping an integer $I = \sum_{i=1}^{n} y_i 2^{i-1}$ to a vector $x=(x_n, \ldots, x_1)$ ($x_i E\{0,1\}$, i=1, ..., n). The following exemplary pseudocode illustrates an Algorithm G for calculating a Gray code G(I):

Algorithm G; input: $(y_n, \ldots, y_1)$; output: $(x_n, \ldots, x_1)$
1. $x_n := y_n$
2. for i=n-1 downto 1 do $x_i := y_i \odot x_{i+1}$.
Based on the definition of G:

For $I \ge 2^{n-1}$, $G(I) = 2^{n-1} + G(2^n - 1 - I)$.

Using the recursive algorithms for J and G, the mappings J and G are the inverse functions of each other. To show this, consider the example of an order relation between any two points $p=(p_n, \ldots, p_1)$ and $q=(q_n, \ldots, q_1)$ in $[0,1)^n$ that is desired to be determined. The first phase of the determination is based on the code J. In order to have a unique binary representation for any number, one of two equivalent tail expansions, 1000... and 0111..., is selected. Let $p_j^1 = \lfloor 2p_j \rfloor$ and $q_j^1 = \lfloor 2q_j \rfloor$. The tail expansions are obtained, for example, by discarding all the bits defining the data points under consideration except for the first bit of each point.

To compare p and q, $J(p_n^1, \ldots, p_1^1)$ and $J(q_n^1, \ldots, q_1^1)$ are first compared. If $J(p_n^1, \ldots, p_1^1)$ and $J(q_n^1, \ldots, q_1^1)$ are distinct, then the comparison has been decided. Otherwise, a comparison is performed that is based on the second bits of each point under consideration, and so on. In this situation, though, J is not used directly. Because the ordering reflects distance, the points are transformed using an affine transformation described below. When the points are selected independently from a uniform distribution, the comparison is resolved in the first phase of the determination with probability $1-2^{-n}$, so the expected number of passes for resolving the comparison is $1+1/(2^n-1)$.

Code J induces an ordering on the $2^n$ sub-cubes of a unit cube that are obtained by cutting the unit cube with the hyperplanes $\{x_i = 0.5\}$ (i=1, ..., n). More specifically, for every $a=(a_n, \ldots, a_1) \in \{0,1\}^n$, let $$S(a) = \{x=(x_n, \ldots, x_1) | 0 \le x_i < \frac{1}{2} \text{ if } a_i = 0, \frac{1}{2} \le x_i < 1 \text{ if } a_i = 1\}.$$

Sub-cubes S(a) are disjoint and ordered by the function J, that is, S(a) comes before S(a') if and only if J(a)<J(a'). When p and q belong to distinct sub-cubes, p and q inherit their ordering relation from the ordering on the sub-cubes. When p and q are in the same S(a), the sub-cubes of S(a) must be considered. It is crucial that the orderings on the sub-cubes of the S(a)'s, except the last sub-cube, are such that for every a, the last sub-cube of S(a) is adjacent to the first sub-cube of S(a'), where S(a') is the sub-cube that succeeds S(a) in the ordering over the sub-cubes of the unit cube. When this condition is not satisfied, there are two distant points in the cube that are arbitrarily close in the linear order. In order for the indexing scheme of the present invention to be efficient, this condition should never happen. Thus, the ordering on the sub-cubes of each S(a) is determined by first applying a suitable affine transformation, and then by applying the function J.

For each $I E\{0, \ldots, 2^n-1\}$, an affine transformation $A_I$ of $R^n$ maps the set $\{0,1\}^n$ onto itself, and requires that C be defined with respect to all types of cubes $I_1 \times \ldots \times I_n$, where each $I_i$ is either [0,1) or (0,1], and with respect to all the permutations of the coordinates. For simplicity of notation, however, the following is preferred:

$$C(v) = 2^{-n}[J(v^1) + C(A_{J(v^1)}(2v - v^1))].$$

It is essential that the transformations can be computed in a time that is proportional to the dimension of the space. The affine transformation $A_I$ is composed of a "reflection" component and a "swap" component as:

$$A_I(v) = P(I) \cdot (s(I) \odot v).$$

The reflection component is a vector $s=s(I)E\{0,1\}^n$, while the swap component is a permutation matrix P=P(I) of order n×n that swaps coordinate n with some coordinate i=i(I). For example, if i≠n, then the only difference between P and an n×n identity matrix is that $P_{in} = P_{ni} = 1$ and $P_{ii} = P_{nn} = 0$.

The following exemplary pseudocode illustrates an Algorithm s for calculating the reflection component s(I), where $e_n = (0, \ldots, 0, 1)$:

Algorithm s; input: I; output: s=s(I)
if I=0 then s:=0
else if $I \equiv 1 \pmod{2}$ then s:=G(I-1)
else if $I \equiv 2 \pmod{4}$ then s:=G(I-1)-$e_n$
else if $I \equiv 0 \pmod{4}$ then s:=G(I-1)+$e_n$.

It follows from the definition of the Gray code that if $k \equiv 1 \pmod{4}$, then $G(k) = G(k-1) + e_n$, in which case $s(k+1) = G(k) - e_n = G(k-1)$. When $k \equiv 3 \pmod{4}$, then $G(k) = G(k-1) - e_n$, in which case again $s(k+1) = G(k) + e_n = G(k-1)$. For even k, by definition s(k+1) = G(k).

The swap component P=P(I) is determined by the index i=i(I) of the coordinate that is swapped under P with coordinate n. Index i(0) is defined to be $i(2^n-1) = 1$. For $I = \sum_{i=1}^{n} x_i 2^{i-1}$, such that $0 < I < 2^n - 1$, i(I) is the largest index $j \ge 2$ such that $x_k = 0$ for all $2 \le k < j$. The following exemplary pseudocode illustrates an Algorithm i for calculating an index:

Algorithm i; input: I; output: i=i(I)
if I=0 or $I = 2^n - 1$, then i:=1 else
1. i:=2
2. $I := \lfloor (I+1)/2 \rfloor$ 3. while I≡0 (mod 2) do
   (a) i:=i+1
   (b) I:=⌊I/2⌋.

Thus, for even k>0, i(k)=i(k−1). In step 2 of Algorithm i, I is converted to ⌊(k+1)/2⌋ (for input k), and to ⌊k/2⌋ (for input k−1). When k>0 is even, then ⌊(k+1)/2⌋=⌊k/2⌋, so the result of Algorithm i is the same for k and k−1. Consequently, for $0<k<2^n-1$, G(k+1) and G(k−1) differ in coordinates 1 and i(k).

Affine transformations for the case n=2 are summarized in Table I:

TABLE I

| I | G(I − 1) | Δ | s(I) | i(I) | $A_1(x_2, x_1)$ |
|---|---|---|---|---|---|
| 00 |  |  | 00 | 1 | $(x_1, x_2)$ |
| 01 | 00 |  | 00 | 2 | $(x_2, x_1)$ |
| 10 | 01 | −01 | 00 | 2 | $(x_2, x_1)$ |
| 11 | 11 |  | 11 | 1 | $(1 − x_1, 1 − x_2)$ |

Affine transformations for the case n=3 are summarized in Table II:

TABLE II

| I | G(I − 1) | Δ | s(I) | i(I) | $A_1(x_3, x_2, x_1)$ |
|---|---|---|---|---|---|
| 000 |  |  | 000 | 1 | $(x_1, x_2, x_3)$ |
| 001 | 000 |  | 000 | 2 | $(x_2, x_3, x_1)$ |
| 010 | 001 | −001 | 000 | 2 | $(x_2, x_3, x_1)$ |
| 011 | 011 |  | 011 | 3 | $(x_3, 1 − x_2, 1 − x_1)$ |
| 100 | 010 | +001 | 011 | 3 | $(x_3, 1 − x_2, 1 − x_1)$ |
| 101 | 110 |  | 110 | 2 | $(1 − x_2, 1 − x_3, x_1)$ |
| 110 | 111 | −001 | 110 | 2 | $(1 − x_2, 1 − x_3, x_1)$ |
| 111 | 101 |  | 101 | 1 | $(1 − x_1, x_2, 1 − x_3)$ |

Affine transformations for the case n=4 are summarized in Table III:

TABLE III

| I | G(I − 1) | Δ | s(I) | i(I) | $A_1(x_4, x_3, x_2, x_1)$ |
|---|---|---|---|---|---|
| 0000 |  |  | 0000 | 1 | $(x_4, x_3, x_2, x_4)$ |
| 0001 | 0000 |  | 0000 | 2 | $(x_2, x_3, x_4, x_1)$ |
| 0010 | 0001 | −0001 | 0000 | 2 | $(x_2, x_3, x_4, x_1)$ |
| 0011 | 0011 |  | 0011 | 3 | $(x_3, x_4, 1 − x_2, 1 − x_1)$ |
| 0100 | 0010 | +0001 | 0011 | 3 | $(x_3, x_4, 1 − x_2, 1 − x_1)$ |
| 0101 | 0110 |  | 0110 | 2 | $(1 − x_2, 1 − x_3, x_4, x_1)$ |
| 0110 | 0111 | −0001 | 0110 | 2 | $(1 − x_2, 1 − x_3, x_4, x_1)$ |
| 0111 | 0101 |  | 0101 | 4 | $(x_4, 1 − x_3, x_2, 1 − x_1)$ |
| 1000 | 0100 | +0001 | 0101 | 4 | $(x_4, 1 − x_3, x_2, 1 − x_1)$ |
| 1001 | 1100 |  | 1100 | 2 | $(x_2, 1 − x_3, 1 − x_4, x_1)$ |
| 1010 | 1101 | −0001 | 1100 | 2 | $(x_2, 1 − x_3, 1 − x_4, x_1)$ |
| 1011 | 1111 |  | 1111 | 3 | $(1 − x_2, 1 − x_3, 1 − x_4, 1 − x_1)$ |
| 1100 | 1110 | +0001 | 1111 | 3 | $(1 − x_2, 1 − x_3, 1 − x_4, 1 − x_1)$ |
| 1101 | 1010 |  | 1010 | 2 | $(1 − x_2, x_3, 1 − x_4, x_1)$ |
| 1110 | 1011 | −0001 | 1010 | 2 | $(1 − x_2, x_3, 1 − x_4, x_1)$ |
| 1111 | 1001 |  | 1001 | 1 | $(1 − x_1, x_3, x_2, 1 − x_4)$ |

The following exemplary pseudocode illustrates an Algorithm C that is used for calculating the code C(v) of a given point $v=(v_n, \ldots, v_1)$, where each $v_j$ is an m-bit number, $v_j = \sum_{i=1}^{m} v_{ij} 2^{-i}$ ($v_{ij} \in \{0,1\}$, $j=1, \ldots, n$, $i=1, \ldots, m$). Algorithm C produces the representation $C(v) = \sum_{i=1}^{m} I_i 2^{-in}$ ($0 \leq I_i < 2^n$) ($i=1, \ldots, m$), which also produces the representation $v = \sum_{i=1}^{m} 2^{-i} v^i$, where $v^i = (v_{i1}, v_{i2}, \ldots, v_{in})$ ($i=1, \ldots, m$). All the operations on vectors in Algorithm C are component-wise.

Algorithm C; input: $v=(v_n, \ldots, v_1)$; output: $C=C(v)=\sum_{i=1}^{m} I_i 2^{-in}$ 1. i:=1; s:=0; P=I 2. while v≠0 do
   2.1 Convert v into a bit vector and a remainder:
      (a) $v^i := \lfloor 2v \rfloor$
      (b) $v := 2\backslash v - v^i$
   2.2 Compute $I_i$:
      $I_i := J(P \bullet (s \therefore v^i))$
   2.3 Compute the new transformation:
      (a) $s := s \bullet (P \bullet s(I_i))$
      (b) $P := P \bullet P(I_i)$
   2.4 Increment} i:
      i:=i+1.

The mapping C is adequate for unambiguous coding of n-dimensional data, that is, the mapping C is one-to-one. As proof, suppose p and q are distinct points in $[0,1)^n$. There exist unique representations $p = \sum_{i=1}^{\infty} p^i 2^{-i}$ and $q = \sum_{i=1}^{\infty} q^i 2^{-i}$, where $\{p^i, q^i\} \subset \{0,1\}^n$ ($i=1, 2, \ldots$), and for every natural N and every j ($1 \leq j \leq n$), there exist k, l>N such that $p_k^i = q_l^i = 0$. Let i ($i \geq 1$) be the smallest index such that $p^i \neq q^i$. It follows that in the hierarchy of the sub-cubes of the unit cube that are obtained by repeatedly halving all the dimensions, there exists a sub-cube $S_0$ of the unit cube having edges of length $2^{-i+1}$, such that $\{p,q\} \subset S_0$, whereas there exist two disjoint sub-cubes $S_1, S_2$ of $S_0$, having edges of length $2^{-i}$, such that $pES_1$ and $qES_2$. The points of $S_1$ and $S_2$ are mapped under J into two disjoint intervals of $[0,1)$ each of length $2^{-in}$. Thus, $J(p) \neq J(q)$.

For convenience, the following notation is introduced. For $m=1,2,\ldots$,

1. For $k_1, \ldots, k_n$ such that $0 \leq k_j \leq 2^m - 1$ (j=1, \ldots, n), the cube $S(k_1, \ldots, k_n; m)$ is defined to be equal to $\{x \in R^n | k_j 2^{-m} \leq x_j < (k_j+1), 2^{-m}, j=1, \ldots, n\}$.

2. S(m) denotes the collection of all the cubes $S(k_1, \ldots, k_n; m)$.

3. For every SES(m), the members of S(m+1) that are contained in S are denoted by S(m+1;S). Also, if SES(m) is not the sub-cube that is mapped under C into $[1−2^{-mn}, 1)$, then the member of S(m) that succeeds S in the ordering induced by C is denoted by S'. For example, if S is mapped into $[k2^{-mn}, (k+1)2^{-mn})$, then S' is mapped into $[(k+1)2^{-mn}, (k+2)2^{-mn})$.

Note that for each m, the members of S(m) are mapped under C into $2^{mn}$ disjoint (half open) subintervals of $[0,1)$, each of length $2^{-mn}$. For $m=1,2,\ldots$, and for every SES(m), except for the last S relative to the ordering induced by C, the last member of S(m+1;S) and the first member of S(m+1;S') are adjacent sub-cubes, that is, they have a common facet. As proof, first consider the case of m=1. Suppose SES(1) is mapped into the interval $$T(1,k) \equiv [k2^{-n}, (k+1)2^{-n})$$

where $0 \leq k \leq 2^n - 2$. Thus, the last member of S(2;S) is mapped into the interval $$T_L \equiv T(2, 2^n(k+1)-1) = [(k+1)2^{-n} - 2^{-2n}, (k+1)2^{-n}),$$

while the first member of S(2;S') is mapped into $$T_R \equiv T(2, 2^n(k+1)) = [(k+1)2^{-n}, (k+1)2^{-n} + 2^{-2n}).$$

If a point $v_R = \frac{1}{2} v_R^1 + \frac{1}{4} v_R^2 + \epsilon_R$ (where $v_R^i E\{0,1\}^n$, i=1,2, and $\epsilon_R E[0, \frac{1}{4})^n$) has $C(v_R) ET_R$, then the first two values that Algorithm C calculates for point $v_R$ are $I_1 = k+1$ and $I_2 = 0$. Thus, necessarily, $$J(v_R^1) = k+1$$

which is the same as $v_R^1 = G(k+1)$.

Now, the first values of the other objects computed by Algorithm C are $S_R^1 = S_R^0 \odot (P_R^0 \bullet s(k+1) = s(k+1)$, and $P_R^1 = P_R^0 \bullet P(k+1) = P(k+1)$.

Thus, the other necessary condition for $v_R = \frac{1}{2}v_R^1 + \frac{1}{4}v_R^2 + \epsilon$ to be mapped into $T_R$ is:

$0 = I_2 = J(P_R^1 \bullet (S_R^1 \odot v_R^2)) = J(P(k+1) \bullet (s(k+1) \odot v_R^2))$, which, because $G(0)=0$, is the same as $s(k+1) \odot v_R^2 = 0$, or simply $v_R^2 = s(k+1)$.

Similarly, if a point $v_L = \frac{1}{2}v_L^1 + \frac{1}{4}v_L^2 + \epsilon_L$ has $C(v_L)ET_L$, then the first two values that Algorithm C calculates for $v_L$ are $I_1 = k$ and $I_2 = 2^n - 1$. Thus, necessarily, $J(v_R^1) = k$ which is the same as $v_R^1 = G(k)$.

Because the first values of the other objects computed by Algorithm C are $s_L^1 = s(k)$ and $P_L^1 = P(k)$, the other necessary condition for $v_L = \frac{1}{2}v_L^1 + \frac{1}{4}v_L^2 + \epsilon$ to be mapped into $T_L$ is:

$2^n - 1 = I_2 = J(P_L^1 \bullet (S_L^1 \odot v_L^2)) = J(P(k) \bullet (s(k) \odot v_L^2))$.

Because $G(2^n - 1) = e_n$, this is equivalent to $v_L^2 = s(k) \odot (P(k) \bullet e_n) = s(k) \odot e_{i(k)}$, where $e_j$ denotes a unit vector with 1 in coordinate j. The fact that $v_L^1 = G(k)$ and $v_R^1 = G(k+1)$ implies that points mapped into $T_L$ and $T_R$ must respectively belong to adjacent members of S(1), but in order to prove that they belong to adjacent members of S(2), $v_L^2$ and $v_R^2$ must be relied on. In fact, it suffices to prove that $v_L^2$ and $v_R^2$ always differ in one coordinate.

For odd k, $s(k+1) = G(k-1)$, while for even k, $s(k+1) = G(k)$. Thus, for odd k, $s(k+1) = s(k)$. When k is odd, then $v_R^2 = s(k+1) = s(k)$ and $v_L^2 = s(k) \odot e_{i(k)}$, so $v_R^2$ and $v_L^2$ differ in precisely one coordinate, namely, i(k). Further, when k is even, $v_R^2 = s(k+1) = G(k)$ and $v_L^2 = s(k) \odot e_{i(k)}$, so:

(a) if k=0, then $V_R^2 = 0$ and $v_L^2 = e_1$, so $v_R^2$ and $v_L^2$ differ in precisely one coordinate;

(b) if $k \equiv 0 \pmod 4$ and k>0, then $s(k) = G(k-1) + e_1$, so $v_L^2 = (G(k-1) + e_1) \odot e_{i(k)} = G(k-2) \odot e_{i(k)}$, whereas $v_R^2 = G(k)$. But G(k) and G(k-2) differ only in coordinates 1 and i(k-1). Also, i(k)=i(k-1). Thus, $v_R^2$ and $v_L^2$ differ in only one coordinate, namely, coordinate 1; and (c) if $k \equiv 2 \pmod 4$ and k>0, then $s(k) = G(k-1) - e_1$, so $v_L^2 = (G(k-1) - e_1) \odot e_2 = G(k-2) \odot e_{i(k)}$.

Thus, as in the previous case, $v_R^2$ and $v_L^2$ differ in only one coordinate, i(k).

Finally, given $S \in S(m)$, where m>1, R denotes the member of S(1) that contains S.

Thus, for every two points p,q in $[0,1)^n$, $\|p-q\|_\infty \leq 2|C(p)-C(q)|^{1/n}$.

As proof, consider $p,q E[0,1)^n$, and denote by m the number such that $2^{-mn} \leq |C(p)-C(q)| < 2^{-(m-1)n}$.

Without loss of generality, suppose $C(q)<C(p)$. Because the $2^{-mn} \leq C(p)-C(q)$, and because each member of S(m) is mapped by C into a half open interval of length $2^{-mn}$, points p and q cannot belong to the same member of S(m). On the other hand, because $C(p)-C(q) < 2^{-(m-1)n}$, there exists a k, $1 \leq k \leq 2^{(m-1)n} - 1$, such that $k-1)2^{-(m-1)n} \leq C(q) < C(p) < (k+1)2^{-(m-1)n}$.

If either $C(p) < k2^{-(m-1)n}$ or $C(q) \geq k2^{-(m-1)n}$, then both p and q belong to the same member of S(m) and, hence, $\|p-q\|_\infty < 2^{-m} = (2^{-mn})^{1/n} \leq |C(p)-C(q)|^{1/n}$.

Otherwise, $C(q) < k2^{-(m-1)n} \leq C(p)$.

In this case, p and q belong to distinct members of S(m) that are mapped under C into consecutive intervals [(k-1)$2^{-mn}, k2^{-mn}$) and [$k2^{-mn}, (k+1)2^{-mn}$). These members of S(m) must be adjacent. Thus, $\|p-q\|_\infty < 2 \bullet 2^{-m} \leq 2|C(p)-C(q)|^{1/n}$.

According to the invention, the position of the query point in each order is determined by using a generalized Gray code calculation. The calculation of bits is stopped as soon as the position of the query point in the order relative to the database points has been determined. For example, consider a search based on a single one-dimensional ordering or encoding. Suppose $C:[0,1)^n \to [0,1)$ is a mapping having the following characteristics: (i) C is one-to-one, and (ii) the inverse mapping $C^{-1}:I \to [0,1)^n$ is continuous, where $I \subseteq [0,1)$ is the image of C. Because C is one-to-one into an interval, C defines an order on $[0,1)^n$:

$\forall x, y E[0,1)^n x <_c y \Leftrightarrow C(x) \leq C(y)$

Let $P = \{p_1, \ldots, p_N\} \subset [0,1)^n$.

The linear ordering can be implemented as a simple relation R with only two attributes: an point-id and a value. Each $p_i$ has one entry in R where point-id equals i and value equals $C(p_i)$.

A query consists of two components: a point $qE[0,1)^n$ and a number $kEN$. An exact answer to the query consists a set OEP of size k so that $\forall x EO \forall y E(P \setminus O) \|x-q\| \leq \|y-q\|$.

The relation R is used for obtaining a set of candidates from P. For every $\delta > 0$ define $R(\delta;q) \subseteq P$ as $R(\delta;q) = \{pEP | |C(p)-C(q)| \leq \delta\}$ Because $C^{-1}$ is continuous, the points in $R(\delta)$ are likely to be close in the space $[0,1)^n$. A good implementation for one such index in a conventional DBMS is to form a B-tree index in attribute value.

The definition of C lends itself to a multitude of other possible one-dimensional orderings or encodings because the dimensions 1, . . . , n can be arbitrarily permutated and each permutation defines a different ordering. Sub-cubes that are distant relative to one permutation may be close relative to another one. The sub-cubes hierarchy itself, however, is the same for all the permutations. In order to obtain further orderings that do not share the same hierarchy, a new ordering is defined that is based on C by using a translation vector $\epsilon E[0,\frac{1}{3}]^n$. A mapping $C_\epsilon:[0,1)^n \to [0,1)$ is defined by $$C_\epsilon(x) = C(\frac{3}{4}(x+\epsilon)).$$

For each $\epsilon$, a candidate set is defined by $$R(\delta,\epsilon;q) = \{p \epsilon P \mid |C_\epsilon(p) - C_\epsilon(q)| \leq \delta\}.$$

A fixed number of orderings are used, using a positive parameter $\delta$ as follows:

1. Select l vectors $\epsilon_1, \ldots, \epsilon_l$.
2. For each ordering, define a relation $R_i$ similar to R, based on $C_{\epsilon i}$, instead of C.
3. For a query (q,k), return a candidate set $$\mathbb{R}(\delta, q) = \bigcup_{i=1}^{l} R(\delta, \epsilon_i, q) \quad (2)$$

4. For each point in $R(\delta;q)$, calculate its distance from q and finally return the k closest points.

The sole FIGURE shows a process 10 for determining k nearest-neighbors to a query point in a database according to the present invention. Consider a query according to the present invention in a conventional DBMS. At step 11, an ordering is defined for a data set P of a database. The ordering is based on e one-dimensional codes $C_1, \ldots, C_l$. Preferably, the step of defining an ordering for a data set P of a database forms a plurality of cubes. At step 12, single relation R is created in which R has the attributes of index-id, point-id and value. At step 13, an entry $(j,i,C_{\epsilon j}(p_i))$ is included in relation R for each data point $p_i \epsilon P$, where index-id equals j, point-id equals i, and value equals $C_{\epsilon j}(p_i)$. A B-tree index is created at step 14 that is based on a combination of the index-id attribute and the value attribute.

A query point is received at step 15 and at step 16 a relation Q is created for the query point having the attributes of index-id and value. At step 17, one tuple is generated in the relation Q for each j, $j=1, \ldots l$, where index-id equals j and value equals $C_{\epsilon j}(q)$. A distance d is selected at step 18. At step 19, the index-id attribute for the relation R of each data point $p_i$ is compared to the index-id attribute for the relation Q of the query point. A candidate data point $p_i$ is selected at step 20 when the comparison of the relation R of a data point $p_i$ to the index-id attribute for the relation Q of the query point is less than the distance d. Lower bounds can be calculated for each cube that represent a minimum distance between any point in a cube and the query point. Thus, the step of comparing, step 19, is terminated when no lower bound is less than a distance between the query point and any of the candidate data points. At step 19, k candidate data points $p_i$ are selected as k nearest-neighbors to the query point.

The following exemplary pseudocode in SQL illustrates a query according to the present invention. Of course, other query languages can also be used.

SELECT DISTINCT point-id
FROM R,Q
WHERE R.index-id=Q.index-id
AND R.value<=Q.value+d
AND R.value>=Q.value−d The SQL query returns R(d;q). If the results are satisfying, the k nearest neighbors can be found from the candidate set. Otherwise, a larger candidate set can be obtained by increasing d. The new candidate set will be a superset of R(d;q).

A set of candidate near neighbors is extracted from each B-tree by simply selecting the identification of the points that are within, for example, 30 positions from the query point in the tree. The set of candidate identifications contains many duplicates, so the duplicate points are eliminated. The number of points from each B-tree remaining after eliminating duplicate points may then need to be increased so the number of candidates is at least k.

As previously indicated, the set of candidates that is obtained as the union of the sets of candidates provided by the various orderings is not guaranteed to contain all the k nearest neighbors. In many cases an extremely good approximation is achieved, either in terms of the overlap with the set of the true k nearest neighbors, or in terms of the actual distances between the query point and the reported neighbors when compared to the distances between the query point and the set of the true k nearest neighbors. The present invention also provides a technique for finding the true k nearest neighbors. This extended feature is used when it is essential to get the exact result. If an exact output is desired, the search must be extended and a stopping criteria be defined so that when the algorithm stops it is guaranteed to provide the exact result.

The method works as follows. Candidates are obtained by enlarging the scanned intervals within each of the orderings. At the same time, lower bounds are calculated for various cubes, giving the minimum distance between any point in the cube and the query point. The algorithm stops the search as soon as the available bounds imply that no unchecked database point is closer to the query than any of the current k nearest neighbors. The sub-cubes are stored in the same trees that store the linear orders.

If $q=(q_1, \ldots, q_n)$ is a query point and $$B = B(a,b) = \{x \epsilon R^n \mid a_i \leq x_i \leq b_i, i=1, \ldots, n\}$$

(a,b $\epsilon R^n$) is a rectangular box, then the Euclidean distance between q and B can be computed as follows. The nearest point of the cube is obtained by minimizing $\Sigma_{i=1}^{n}(q_i - x_i)^2$ subject to $a_i \leq x_i \leq b_i (i=1, \ldots, n)$. The objective function is separable, so the optimal solution can be described as follows: (i) If $q_i \leq a_i$, then let $d_i = a_i - q_i$; (ii) If $a_i \leq q_i \leq b_i$, then let $d_i = 0$; and (iii) If $qi \geq b_i$, then let $d_i = q_i - b_i$. The distance between q and B is given by $\delta(q,B) = \|d\|$, where $d = (d_1, \ldots, d_n)$.

Suppose for a given q there are k points in the database that are nearest to q that are desired to be obtained. Suppose further the database points $p^1, \ldots, p^k$ have already been located as candidates for the k nearest neighbors, such that $$\|q-p^1\| < \ldots < \|q-p^k\|.$$

$\|q-p^k\|$ is an upper bound on the distance to the kth nearest neighbor. Thus, if some box B contains database points, and $\delta(q,B) > \|q-p^k\|$, then there is no need to search box B because none of its points can be among the k nearest neighbors. Such bounds become useful in case an exact output is desired. Each of the linear orderings are maintained in a tree where nodes store information about bounding boxes, and the ordering lends itself to creating good boxes.

Let $v^1, \ldots, v^N$ be all the database points. Consider one ordering induced by a code C, so, without loss of generality, assume that $C(v^1) < \ldots < C(v^N)$.

For each i (i=1, ..., N), use the representation $$v^i = \sum_{j=1}^{m} 2^{-j} v^{ij}$$

Thus, the components $v^{i1}, \ldots, v^{N1}$ determine the first level of the ordering. Recall that S(1) denotes the collection of the sub-cubes at the first level of the hierarchy, so it has $2^n$ members, each with a volume of $2^{-n}$. Because N is expected to be much smaller than $2^n$, most of the members of S(1) will not contain any database point. The members of S(1) that do contain such points can be stored at the leaves of a balanced tree according to the order that is induced on them by the codes J(vi1), that is, the inverse of the Gray code. Due to the nature of this code, if two sub-cubes are close in the ordering, then there exists a relatively small box that contains their union. For example, any two consecutive members form a box of volume $2^{-n+1}$, and any two members that are at distance 2 in the ordering are contained in a box of volume $2^{-n+2}$. In general, if the two children of a node in the tree hold the boxes $B(a^1,b^1)$ and $B(a^2,b^2)$, then the parent holds the box B(a,b) where $a_i = \min(a_i^1, a_i^2)$ and $b_i = \max(b_i^1, b_i^2)$. Thus, relying on the currently known upper bounds on the distance to the kth nearest neighbor, the present invention can determine not to proceed into the subtree rooted at the node, if the box associated with it is sufficiently distant from the query point.

During the search for the exact k nearest neighbors, the present invention maintains the following information. First, there is a global upper bound on the distance between the query point and the kth nearest neighbor. Second, in each tree, there is the current interval in the corresponding ordering all of whose points have been checked. Moreover, in each such tree some of the nodes are marked as ones whose subtrees should not be checked. The intervals are expanded repeatedly, and the upper bound is updated. At the same time, lower bounds are updated for a collection of nodes having subtrees that cover the unchecked data points. In each tree, the number of such subtrees at any time does not exceed O(log n) where n is the number of data points. The search may stop when in one tree all the lower bounds of subtrees that cover the unchecked points are greater than the global upper bound.

While the present invention has been described in connection with the illustrated embodiments, it will be appreciated and understood that modifications may be made without departing from the true spirit and scope of the invention.

What is claimed is:

1. A method for determining k nearest-neighbors to a query point in a database, the method comprising the steps of:

defining an ordering for a data set P of a database, the ordering being based on l one-dimensional codes $C_1, \ldots, C_l$;

creating a single relation R having attributes index-id, point-id and value;

including an entry $(j, i, C_{ej}(p_i))$ in relation R for each data point $p_i \in P$, where index-id equals j, point-id equals i, and value equals $C_{ej}(p_i)$;

creating a B-tree index based on a combination of the index-id attribute and the value attribute;

receiving a query point;

creating a relation Q for the query point having attributes index-id and value;

generating one tuple in the relation Q for each j, j=1, ..., l, where index-id equals j and value equals $C_{ej}(q)$;

selecting a distance d;

comparing the index-id attribute for the relation R of each data point $p_i$ to the index-id attribute for the relation Q of the query point;

selecting a candidate data point $p_i$ when the comparison of the relation R of a data point $p_i$ to the index-id attribute for the relation Q of the query point is less than the distance d; and selecting k candidate data points $p_i$ as k nearest-neighbors to the query point.

2. The method according to claim 1, wherein the step of defining an ordering for a data set P of a database forms a plurality of cubes, the method further comprising the steps of:

calculating lower bounds for each cube of the plurality of cubes, the lower bound representing a minimum distance between any point in a cube and the query point; and terminating the step of comparing when no lower bound is less than a distance between the query point and any of the candidate data points.

* * * * *